(12) United States Patent
Conley et al.

(10) Patent No.: US 10,278,399 B2
(45) Date of Patent: May 7, 2019

(54) METHOD OF PRODUCING A FROZEN DOUGH, AND RELATED PRODUCTS

(71) Applicant: General Mills, Inc., Minneapolis, MN (US)

(72) Inventors: Jill A. Conley, Shakopee, MN (US); Kevin A. Haas, St. Louis Park, MN (US); Peter W. Statt, White Bear Lake, MN (US)

(73) Assignee: General Mills, Inc., Minneapolis, MN (US)

( * ) Notice: Subject to any disclaimer, the term of this patent is extended or adjusted under 35 U.S.C. 154(b) by 335 days.

(21) Appl. No.: 14/707,298

(22) Filed: May 8, 2015

(65) Prior Publication Data

US 2015/0366224 A1    Dec. 24, 2015

Related U.S. Application Data

(60) Continuation of application No. PCT/US2014/042912, filed on Jun. 18, 2014, and a division of application No. 14/644,465, filed on Mar. 11, 2015.

(51) Int. Cl.
*A21D 6/00* (2006.01)
*A21D 10/02* (2006.01)

(52) U.S. Cl.
CPC ............. *A21D 10/02* (2013.01); *A21D 6/001* (2013.01)

(58) Field of Classification Search
CPC ..................................................... A21D 8/02
See application file for complete search history.

(56) References Cited

U.S. PATENT DOCUMENTS

| | | | |
|---|---|---|---|
| 2,915,823 A * | 12/1959 | Wohlfeil | 30/306 |
| 4,839,178 A | 6/1989 | Seneau | |
| 4,966,782 A | 10/1990 | Heidolph et al. | |
| 5,792,499 A * | 8/1998 | Atwell | A21D 6/001 426/549 |
| 5,925,397 A | 7/1999 | Chung | |
| RE36,785 E | 7/2000 | Colson et al. | |
| 6,391,366 B1 | 5/2002 | Boldon | |
| 6,436,459 B2 | 8/2002 | Martinez-Serna Villagran et al. | |
| 2004/0052908 A1 | 3/2004 | Boyle et al. | |
| 2008/0260926 A1 | 10/2008 | Kraklow et al. | |
| 2009/0035288 A1 | 2/2009 | Albers et al. | |
| 2009/0130252 A1* | 5/2009 | Domingues et al. | 426/8 |
| 2010/0119659 A1 | 5/2010 | Ovadia et al. | |
| 2012/0128819 A1* | 5/2012 | Fischer | A21D 2/183 426/19 |

OTHER PUBLICATIONS

Phillips, Sarah. "Leaveners" 2000 https://www.craftybaking.com/learn/ingredients/leaveners.*

(Continued)

*Primary Examiner* — Patricia A George
(74) *Attorney, Agent, or Firm* — Diederiks & Whitelaw, PLC; John L. Crimmins, Esq.

(57) ABSTRACT

Disclosed is a frozen product and methods of making the frozen product. The frozen product includes a frozen biscuit dough that bakes without prior thawing in a reduced time. The frozen biscuit dough includes a leavening system that comprises a fast acting leavening acid. Also included are methods of making a baked good from a frozen product.

21 Claims, 5 Drawing Sheets

(56) References Cited

OTHER PUBLICATIONS

Caballero: Improvement of dough rheology, bread quality and bread shelf-life by enzymes combination; Journal of Food Engineering, vol. 81, Issue 1, Jul. 2007, pp. 42-53.*
Campbell: Proving of Bread Dough: Modelling the Growth of Individual Bubbles; © Institution of Chemical Engineers; Trans IChemE, vol. 76, Part C, Jun. 1998.*
Chin: Dough aeration and rheology: Part 2. Effects of flour type, mixing speed and total work input on aeration and rheology of bread dough; J Sci Food Agric 85:2194-2202 (2005); DOI: 10.1002/jsfa.2237.*
Manley: Manley's Technology of Biscuits, Crackers and Cookies; Elsevier, Sep. 28, 2011—Technology & Engineering—632 pages.*
Kitty: Flaky Buttery Biscuits; Widow on the Prairie; published online as least by Jun. 16, 2010 (as evidenced by the comment by Bonnie Riffle), at: http://windowontheprairie.com/2010/03/23/flaky-buttery-biscuits/.*
Laguerre: Study of domestic refrigerator temperature and analysis of factors affecting temperature: a French survey; International Journal of Refrigeration 25 (2002) 653-659.*
Manley2: Make Ahead Freezer Biscuits, published by CopyKat recipes at least by Sep. 22, 2013 at: https://web.archive.org/web/20170425043015/https://copykat.c (Year: 2013).*
Lehmann: Doughstorage can make or break your operation; published by Pizza Today, In the Kitchen on: Mar. 14, 2013, at: https://www.pizzatoday.com/departments/in-the-kitchen/2009-october-dough-doctor/ (Year: 2013).*

* cited by examiner

METHOD OF PRODUCING A FROZEN DOUGH, AND RELATED PRODUCTS

RELATED APPLICATION

The present application is a continuation application of International Application No. PCT/US2014/042912, titled METHOD OF PRODUCING A FROZEN DOUGH, AND RELATED PRODUCTS, filed on Jun. 18, 2014, and a divisional of U.S. patent application Ser. No. 14/644,465, titled METHOD OF PRODUCING A FROZEN DOUGH, AND RELATED PRODUCTS, filed on Mar. 11, 2015, which are hereby incorporated by reference in their entirety.

BACKGROUND

In the past, preparing and baking a dough would not involve a freezing step. In modern times, though, bakeries and individual consumers greatly enjoy frozen doughs because of the convenience of allowing frozen doughs to be prepared, stored while frozen, and then cooked (e.g., baked) at a convenient time.

Frozen doughs should desirably produce a baked good having properties comparable to baked goods that have been prepared and cooked without having been frozen. In practice, however, it is a substantial challenge to produce doughs that can be frozen for an extended period and then cooked to properties similar to doughs that are not stored frozen. Further, frozen doughs designed to be baked without prior thawing often have extended bake times as compared to doughs that are not stored frozen. Consequently, there exists an ongoing need to achieve desired organoleptic qualities in a frozen dough that also achieves improved baking times without prior thawing.

SUMMARY

This disclosure relates to a frozen biscuit dough having an improved baking time.

Provided herein is a method for making a frozen product. The method includes combining components to make a dough, where the components include a grain flour, water, a fat, and a leavening system including monocalcium phosphate and a leavening alkali; proofing the dough to form a leavened dough having a density of from 1.000 g/cm3 to 1.080 g/cm3; forming the leavened dough into a desired shape to make a formed dough; and freezing the formed dough to produce a frozen product having an average cross sectional area that comprises 12% to 35% void area.

In some embodiments, the freezing step can be performed about 5 minutes to about 15 minutes following the combining step.

In some embodiments, the at least a portion of the proofing step can take place during at least a portion of the combining step and/or at least a portion of the forming step.

In some embodiments, the forming step includes sheeting and cutting the leavened dough into a biscuit shape.

In some embodiments, the sheeting can include adding reworked dough to the leavened dough.

In some embodiments, the dough can have a pH of from about 6.6 to 7.2.

In some embodiments, the dough can further include a cultured dairy component or a sweetener.

In some embodiments, the leavening system further can include sodium aluminum phosphate and/or sodium acid pyrophosphate.

In some embodiments, the method can further include packaging the frozen product.

Also provided herein is a method for making a baked good. The method includes providing a frozen dough having an average cross sectional area that comprises of 12% to 35% void area and a pH of from 6.6 to 7.2, where the dough includes a grain flour, water, a fat, and a leavening system including monocalcium phosphate and a leavening alkali; and heating the frozen dough at a temperature of from about 325° F. to about 400° F. for a time sufficient to produce the baked good.

In some embodiments, the frozen dough can be provided as a biscuit shaped portion. The portion can be from about 60 g to about 100 g.

In some embodiments, the baked good can have an internal temperature of from about 170° F. to about 190° F.

In some embodiments, the heating time can be from about 12 minutes to about 16 minutes.

In some embodiments, the frozen dough can be heated at a temperature of from about 350° F. to about 375° F.

In some embodiments, the frozen dough can further include a cultured dairy product or a sweetener.

In some embodiments, the leavening system can further include sodium aluminum phosphate and/or sodium acid pyrophosphate.

Also provided herein is a frozen product. The frozen product includes a biscuit dough at a temperature of less than about 10° F. and having an average cross sectional area that comprises 12% to 35% void area and a pH of from 6.6 to 7.2, where the dough includes a grain flour, water, a fat, and a leavening system including monocalcium phosphate and a leavening alkali.

In some embodiments, the biscuit dough can further include a dairy component, such as a cultured dairy component, or a sweetener.

In some embodiments, the leavening system can further include sodium aluminum phosphate and/or sodium acid pyrophosphate.

In some embodiments, the frozen product can have a shelf life of at least 3 months at a temperature of 0° F. or less.

Additional objects, features and advantages of the present invention will become more readily apparent from the following detailed description of the invention with reference to the drawings.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Some embodiments of the invention will hereinafter be described in conjunction with the appended drawings, wherein like numerals denote like elements.

Figure 1:
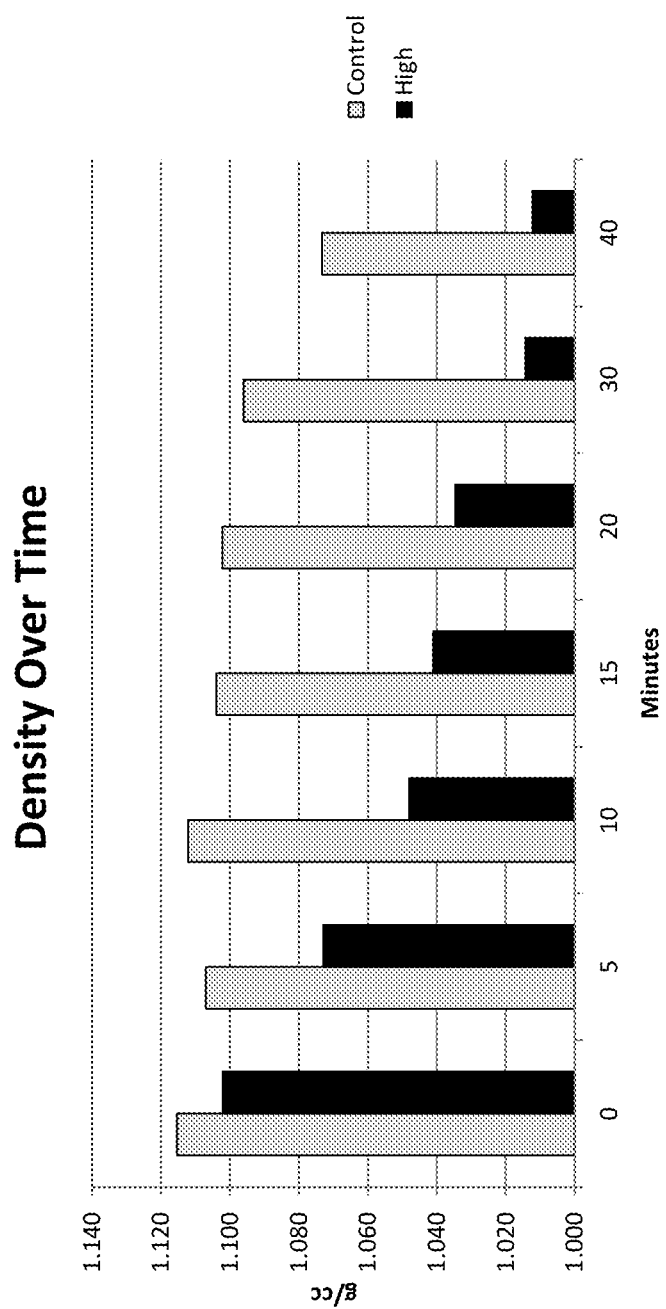
FIG. 1 is a graph of density over time of a dough for a frozen product having a reduced bake time made according to an embodiment provided herein as compared to a dough for a traditional frozen biscuit dough without a reduced bake time.

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

DETAILED DESCRIPTION

Provided herein are methods and compositions relating to a frozen product comprising a biscuit dough that can be cooked from a frozen state without prior thawing.

Unexpectedly, a method for making a frozen product provided herein can be used in producing a biscuit dough that can be leavened, formed, and frozen quickly (e.g., in less than about 30 minutes) to produce a frozen product. Generally, such a process would have been avoided due to a desire to have a more controlled proofing, or reduced proofing, during forming of a dough.

It is also unexpected that such a frozen product can be baked from frozen, without prior thawing, in significantly less time (e.g., from about 20% to about 50% less time, from about 25% to about 35% less time, about 25% less time, about 30% less time, about 33% less time, about 35% less time, or about 40% less time) than traditional frozen biscuit dough. It is surprising that, though a biscuit dough made according to a method provided herein contains more average void area per cross sectional area, which is believed to be a heat insulator, as compared to a traditional frozen biscuit dough, the dough can be baked from a frozen state to make a baked good in significantly less time than a traditional frozen biscuit dough A frozen product can be made according to a method provided herein. A method for making a frozen product includes a step of combining components including a grain flour, a fat, water, and a leavening system to form a dough. In some embodiments, additional components can be included. Components can be selected or adjusted as appropriate in order to make a frozen product that can be baked in a desired amount of time into a baked good having desired characteristics, such as texture (e.g., flakiness or crumbliness), moisture, browning, and the like. In some embodiments, components can be selected or adjusted in order to result in a frozen product having a desired shelf life.

Grain flours suitable for use in a method for making a frozen product include whole grain flours, flours from grain parts (e.g., germ, bran, endosperm), and combinations thereof. Suitable grains include, without limitation, wheat, oat, rice, corn, barley, triticale, and pseudo grains (e.g., quinoa, amaranth, wild rice), and the like. In some embodiments, a grain flour (e.g., oat flour or rice flour) can be selected to produce a baked good that does not contain gluten.

A fat component suitable for use in a method for making a frozen product include any edible fat appropriate for use in making a biscuit dough. Fats suitable for use in a method for making a frozen product provided herein are generally solid at ambient temperature, but in some embodiments, a suitable fat can be liquid at ambient temperature. Examples of suitable fats include, but are not limited to, soybean oil, corn oil, canola oil, copra oil, cottonseed oil, peanut oil, safflower oil, olive oil, sunflower oil, palm oil, palm kernel oil, coconut oil, rice bran oil, rapeseed oil, other vegetable nut/seed oils, beef tallow or other animal tallow, lard, butter fat, oil fractions, hydrogenated oils, interesterified oils, and combinations thereof. In addition, a fat, such as low linolenic soybean oil, high oleic canola oil, and high oleic soybean oil, may be obtained from plants that are trait enhanced by selective breeding or transgenic modification. Also useful can be triglyceride oils that are derived from microorganisms, animals, and plants.

The amount and type of fat to be used in a method for making a frozen product provided herein can be selected based on the desired textural and nutritional characteristics of a baked good made from the frozen product. For example, a fat in an amount of from about 10% to about 15% by weight can be included as a component of a dough provided herein. In some embodiments, the amount of a fat included in a dough can be reduced to provide a lower calorie content of a baked good made from the dough. In some embodiments, a solid fat having a harder texture at ambient temperature can be selected to be included in a dough to reduce the crumbliness of a baked good made from the dough, while a fat having a softer texture at ambient temperature, or a blend of a solid fat and a liquid fat, can be selected to increase crumbliness of the baked good.

An amount of water suitable for use in a method for making a frozen product can be in a range that provides a desirable moisture content and mouthfeel to a baked good made from the frozen product. Useful amounts of water can also be in a range that provides hydration of various other components used in a method for making a frozen product. Water can also serve as a plasticizer and can also regulate the viscosity of a dough made in a method provided herein. A dough made according to a method provided herein can include water in an amount of from about 25% to about 40% (e.g., from about 30% to about 40%, from about 32% to about 38%, about 32%, about 35%, about 38%, and the like) by weight of the dough. The amount of water included can be adjusted based on the water content of other components, such as a grain flour, in order to provide a desired moisture content of the a frozen product made by a method provided herein or a biscuit made from the frozen product. A frozen product produced by a method provided herein can have a moisture content of from about 20% to about 40% (e.g., from about 25% to about 40%, from about 28% to about 38%, about 30%, about 35%, about 40%, and the like) by weight.

A leavening system as described herein includes a leavening alkali (e.g., sodium bicarbonate, potassium bicarbonate, and ammonium bicarbonate) and a leavening acid. In some embodiments, a leavening system can include more than one leavening alkali and/or leavening acid. A leavening system suitable for use in a biscuit dough provided herein includes a fast acting leavening acid. A fast acting leavening acid is a leavening acid, such as monocalcium phosphate (MCP; monohydrate or anhydrous), citric acid, or tartaric acid, or potassium bitartrate, that reacts with a leavening alkali to release at least 70% of carbon dioxide available from the reaction at ambient temperature in the presence of water. The amount of a fast acting leavening acid included is sufficient to result in a dough allowed to rise unrestricted to a density of from 1.000 g/cm$^3$ to 1.085 g/cm$^3$ at a temperature of 55° F. to 75° F. within about 5 minutes to 15 minutes following mixing of the components.

In some embodiments, a leavening system can also include one or more leavening acid that is not fast acting, such as, for example, sodium aluminum phosphate (SALP), and sodium acid pyrophosphate (SAPP). Additional leavening acids that are not fast acting include, without limitation, sodium aluminum sulfate, dicalcium phosphate dehydrate, and glucono-delta-lactone.

Other components suitable for use in a method for making a frozen product provided herein include, but are not limited to, flavor components, color components, emulsifiers, humectants, particulates, and the like. Other components can be selected, as appropriate, to result in a desired texture, appearance, bake volume, nutritional value, or flavor of a baked good made from a frozen product. In some embodiments, components suitable for use in a method for making a frozen product can include components that adjust the pH of a dough made from the components. For example, a method for making a frozen product can combine a grain flour, a fat, water, a leavening system, and an acidic milk product (e.g., a cultured milk powder) or an acidifier (e.g., lactic acid) in order to make a dough having a pH of from about 6.6 to 7.2 (e.g., from about 6.6 to about 7.0, from about 6.8 to about 7.1, from about 6.9 to about 7.0, about 7.0, and the like), to accelerate leavening, and/or to reduce browning of a baked good made from the frozen product.

In some embodiments, components suitable for use in a method for making a frozen product can include components that affect structure of the frozen product, or a baked good made from the frozen product. Examples include proteins (e.g., soy proteins, wheat protein isolate, vital wheat gluten, and the like), hydrocolloids (e.g., pregelatinized starch, alginate, and the like), dairy proteins, and mixtures thereof. Illustrative dairy proteins may include whey, caseinate, buttermilk, buttermilk solids, and nonfat dry milk.

In some embodiments, a sweetener (e.g., a sugar, a sugar alcohol, sugar substitute or mixtures thereof) can be included in a method of making a frozen product. In some embodiments, a sweetener can lower the water activity of a frozen product provided herein. Useful sugars can include monosaccharides, disaccharides, polysaccharides, sugar alcohols, sugar degradation products or combinations thereof. Examples of suitable sugars include, but are not limited to, pentoses, xylose, arabinose, glucose, galactose, amylose, fructose, sorbose, lactose, maltose, dextrose, sucrose, maltodextrins, high fructose corn syrup, molasses, powdered sugar, brown sugar, granulated sugar, liquid sugar, fine sugar, and combinations thereof Suitable sugar alcohols include isomalt, lactitol, maltitol, mannitol, sorbitol, erythritol, xylitol, glycerol/glycerin, and combinations thereof.

In some embodiments, a sweetener can be comprised of a sugar substitute. Useful sugar substitutes can include stevia plant extracts (e.g., Truvia® (developed by Cargill and The Coca-Cola Company) and PureVia™ (developed by PepsiCo and the Whole Earth Sweetener Company)), saccharine, sucralose, polydextrose, aspartame, potassium acetylsulfame, cyclamate, neotame, alitame, and combinations thereof.

In some embodiments, a sweetener, such as sucrose can be included in an amount of up to about 5% (e.g., about 1% to about 4.5%, about 4%, about 1.5%, about 2%, and the like). In some embodiments, a frozen product that includes a sugar can also have a reduced pH in order to reduce browning of a baked good made from the frozen product.

In some embodiments, an additional component can be included in order to help provide a manufacturing benefit, such as a viscosity suitable for use in manufacturing equipment, to protect a dough during manufacturing, or to reduce bake time. For example, diacetyl tartaric acid ester of mono- and diglycerides (DATEM) can be included to strengthen the dough such that the structure of the dough is not destroyed during forming using manufacturing equipment.

Components can be combined in any suitable manner and using any suitable equipment (e.g., a vat mixer, a bowl mixer, or an extruder) to produce a dough. For example, in some embodiments, dry components can be combined prior to the addition of liquid components. In some embodiments, two or more components can be combined into a premix that is further combined with other components. Typically, once the components are combined, the components are mixed briefly (e.g., up to about 10 minutes, up to about 6 minutes, about 2 minutes to about 5.5 minutes, about 3 minutes, about 3.5 minutes, about 4 minutes, and the like) in order to prevent excessive loss of carbon dioxide from the dough.

The dough is proofed to form a leavened dough. In some embodiments, a dough is proofed from about 4 minutes to about 45 minutes (e.g., from about 4 to about 10 minutes, from about 4 minutes to about 15 minutes, from about 5 minutes to about 30 minutes, and the like) in order to produce a leavened dough. In some embodiments, proofing can be carried out at a temperature of from about 55° F. to about 75° F. in order to control the rate of proofing or to allow for later freezing within a desired time period. Proofing can be performed using any appropriate equipment. For example, in some embodiments, proofing can be performed in the container the components are mixed in. In some embodiments, proofing can be performed during transit of the dough from the container to other manufacturing equipment. In some embodiments, proofing can continue through all or part of a forming step. In some embodiments, a dough can proof during at least a portion of the combination and/or mixing of the ingredients to make the dough. A dough can reach a density of from about 1.000 g/cm$^3$ to about 1.085 g/cm$^3$ at one or more point during proofing. A dough need not remain at a density of 1.000 g/cm$^3$ to about 1.085 g/cm$^3$ once it reaches the density.

Leavened dough can be formed after or during all or a part of proofing to form a formed dough that has a desired shape and/or a desired dimension. In some embodiments, the forming step portions the leavened dough into pieces having a desired mass.

Forming can include one or more steps of sheeting, cutting, or otherwise forming a desired shape for the leavened dough. For example, leavened dough can be sheeted using, for example, rollers (e.g., a 3-roll extruder, dough reduction units, and the like), one or more times, and then be cut into portions. Portions can be any desired shape, such as a biscuit shape (e.g., round, oval, rectangular, or other shape). In some embodiments, a leavened dough can be formed into portions suitable to produce a desired baked good. For example, a leavened dough can be formed into portions that are about 20 g to about 100 g (e.g., from about 20 g to about 50 g, from about 20 g to about 40 g, about 30 g to about 60 g, from about 30 g to about 70 g, from about 40 g to about 70 g, from about 50 g to about 80 g, from about 60 g to about 90 g, about 35 g, about 60 g, about 70 g, about 75 g, about 80 g, about 85 g, about 90 g, and the like) for a biscuit.

In some embodiments, leavened dough that remains unformed following the forming step can be added, as reworked dough, to leavened dough and sent through the forming step one or more additional times. In some embodiments, reworked dough can be added to leavened dough at a ratio of from 2:1 to 1:2 (e.g., about 1:1). The amount of reworked dough added to leavened dough can affect the final density of the shaped dough following the forming step.

In some embodiments, forming a leavened dough can result in a formed dough having an increased density as compared to the leavened dough prior to forming. A formed dough provided herein can have a density of from about 1.065 g/cm$^3$ to about 1.155 g/cm$^3$ (e.g., from about 1.070 g/cm$^3$ to about 1.150 g/cm$^3$, from about 1.075 g/cm$^3$ to about 1.145 g/cm$^3$, and the like). Although a formed dough can have an increased density as compared to a leavened dough prior to forming, the formed dough can retain voids formed by bubbles created during proofing.

A formed dough is frozen to a temperature of less than 32° F. (e.g., less than 10° F., less than 0° F., and the like) to form a frozen product. The freezing step can be performed using any appropriate equipment and methods. For example, a formed dough can be frozen using a blast freezer. In some embodiments, equipment used to freeze a formed dough can be at a temperature of less than the desired temperature of the frozen product in order to quickly freeze the formed dough. In some embodiments, a dough is subjected to the freezing step within about 45 minutes (e.g., within about 30 minutes, within about 20 minutes, within about 15 minutes, from about 10 minutes to about 12 minutes, and the like) following the mixing step.

Figure 4:
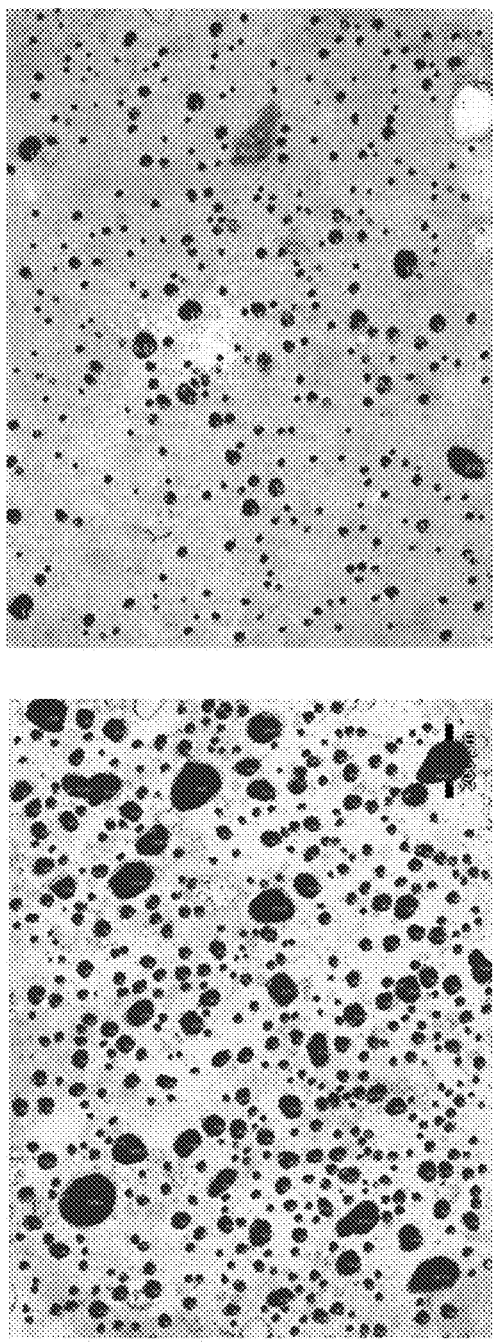
FIG. 4 shows photomicrographs of a frozen product having a reduced bake time according to an embodiment provided herein and a traditional frozen biscuit dough without a reduced bake time with void spaces shown in black.

In some embodiments, a formed dough or a frozen product provided herein can have a significantly larger average void area per cross sectional area relative to a similar formed dough or frozen product with a standard (i.e., non-reduced) baking time directly from frozen. Voids can be created by air bubbles formed during the proofing step. Average void area can be determined by measuring the total area of voids in a cross section of a formed dough or frozen product (e.g., as shown in Example 4, below) and determining the average total void area over several samples of the formed dough or frozen product. A larger average void per cross sectional area can result from proofing a dough to a density of from 1.000 g/cm$^3$ to about 1.085 g/cm$^3$ at one or more point during proofing. For example, as shown in FIG. 4 and Table 2, below, a formed dough or frozen product provided herein (labeled "High") can have an average void area per cross sectional area that is at least about 2 times greater (e.g., about 2 times greater to about 5 times greater, about 2 times greater to about 4 times greater, about 2.5 times greater, about 3 times greater, about 3.5 times greater, and the like) as compared to a similar product with a standard baking time directly from frozen (labeled "Control"). In some embodiments, a formed dough or frozen product provided herein can have an average cross sectional area that comprises at least about 12% (e.g., about 12% to about 35%, about 15% to about 30%, about 20% to about 25%, and the like) void area.

In some embodiments, a formed dough or frozen product provided herein can have a significantly greater average number of voids per area than a product with a standard baking time directly from frozen. The average number of voids can be determined by counting the voids in a cross section of a known area of a formed dough or a frozen product (e.g., as shown in Example 4, below) and determining the average over several samples of the formed dough or frozen product. For example, as shown in FIG. 4 and Table 2, below, a formed dough or frozen product provided herein can have at least, on average, about 20% more voids per area (e.g., about 20% to about 80% more, about 30% to about 70% more, about 40% to about 60% more, about 45% more, about 50% more, about 55% more, and the like).

In some embodiments, a formed dough or frozen product provided herein can have voids distributed generally evenly throughout the formed dough or frozen product. For example, as shown in FIG. 4, a formed dough made by a method provided herein (labeled "High") exhibits a large number of voids generally evenly distributed throughout the formed dough relative to a similar formed dough with a standard baking time directly from frozen (labeled "Control").

A frozen product provided herein can also have a shelf life of at least 3 months when stored at 0° F. or less. In other words, a baked good made from a frozen product provided herein that is stored at 0° F. or less for 3 months is substantially similar in texture, appearance, and flavor to a baked good made from the frozen product immediately after production.

A frozen product provided herein can be handled, stored, and packaged, as appropriate. For example, a frozen product provided herein can be packaged individually, or in bulk, and stored at a temperature of 10° F. or less.

As previously mentioned, a frozen product provided herein can be baked in significantly less time from a frozen state to produce a baked good as compared to a traditional frozen biscuit dough. Generally, a frozen product is baked at a time and temperature sufficient to produce a baked good (i.e., a fully cooked or baked dough). In some embodiments, a frozen product is baked at a time and temperature sufficient to reach a desired internal temperature (e.g., from about 170° F. to about 200° F., from about 175° F. to about 190° F., or the like). The amount of time and the temperature can also be selected to result in a desired level of browning. In some embodiments, the amount of time and the temperature can be selected depending on the presence of a leavening acid that is not fast acting in order to cause additional leavening during baking.

A frozen product can be baked in any appropriate device, such as a convection oven or a conventional oven, at a temperature of from about 300° F. to about 400° F. (e.g., from about 325° F. to about 350° F., from about 325° F. to about 375° F., from about 350° F. to about 375° F., and the like). The amount of time can be increased at a lower baking temperature or decreased at a higher baking temperature, to result in the desired qualities of the baked good. For example, a frozen product provided herein that are about 70 g to about 90 g can be baked from frozen to produce a baked biscuit in about 10 minutes to about 18 minutes (e.g., from about 10 minutes to about 16 minutes, from about 11 minutes to about 16 minutes, from about 12 minutes to about 16 minutes, and the like). The amount of baking time used can also be adjusted based on the size of the frozen product. For example, a frozen product having a lower weight can be baked for less time to produce a baked good than a frozen product having a greater weight. For example, a frozen product provided herein that is about 20 g to about 50 g can be baked from frozen to produce a baked biscuit in about 5 minutes to 10 minutes (e.g., from about 5 minutes to 8 minutes, from about 6 minutes to about 9 minutes, and the like).

EXAMPLES

The following examples are intended to illustrate particular embodiments of the invention, and are not intended to limit the scope of the claimed invention.

Example 1

Two frozen biscuit doughs designed to have a reduced baking time were produced and compared to a traditional frozen biscuit dough. Table 1 compares the content of the main components of the traditional frozen biscuit dough (Control), a low sugar (Low) frozen biscuit dough having a reduced baking time, and a high sugar (High) frozen biscuit dough having a reduced baking time. Each of the doughs had a similar flour, water, and fat content. The Low biscuit dough had a similar sugar content to the Control dough, while the High dough had a sugar content of about 4 times that of the Control dough. Each of the reduced bake time doughs (High, Low) included a cultured milk powder to help reduce the pH to prevent overbrowning, while the Control dough included a blend of dairy components. The pH of the Control dough was about 7.3, and the High dough had a pH of 6.9. Additional ingredients were similar across each of the doughs.

TABLE 1

| Component | Control | Low<br>% by weight | High |
|---|---|---|---|
| Wheat flour | 47 | 44 | 45 |
| Shortening | 12.5 | 12.9 | 12.9 |
| Baking soda | 1.3 | 1.6 | 1.4 |
| MCP monohydrate | 0 | 0.3 | 0.3 |
| SALP | 1.1 | 1.1 | 1.1 |
| SAPP | 0.6 | 0.6 | 0.6 |
| Water | 30.7 | 31.9 | 29.9 |

For the High and Low doughs designed to have a reduced baking time, the dry components were combined, and then the liquid components were added and mixed for 2.5 to 3.5 minutes. Following mixing of the dough components, the High and Low doughs were proofed at 55-75° F. temperature for 5-15 minutes before sheeting to an average thickness of about 20 mm and cut into oval biscuit shapes of 69 mm wide×75 mm long, and about 80 grams each. The biscuits were then frozen to a temperature of 0° F. or below, 10-30 minutes following the combination of the dough components.

For the Control dough, the dry components were combined, and then the liquid components were added and mixed for 2.5 to 3.5 minutes. Following mixing of the dough components, the Control dough was proofed at 55-75° F. temperature for 5-15 minutes before sheeting to an average thickness of about 20 mm and cut into oval biscuit shapes of 69 mm wide×75 mm long, and about 80 grams each. The biscuits were then frozen to a temperature of 0° F. or below, 10-30 minutes following the combination of the dough components.

Each of the frozen biscuit doughs was placed onto a baking sheet of 20 biscuits per half sheet pan and into a convection oven at 360° F. The temperatures at the centers of the High formula and the Control formula were monitored. The High formula reached an internal temperature of 190° F. at 12.5 minutes, and was fully cooked in about 13.5 minutes, while the Control formula reached 193° F. at 16 minutes, but the exterior was extremely dark brown. The Low formula similarly finished baking in about 14 minutes.

When the High and Control formula frozen biscuit doughs were placed in a 325° F. oven, the High formula reached an internal temperature, measured at the center of the biscuit, of 180° F. at 15 minutes, and had a surface that was very light brown in color. The Control formula reached an internal temperature, measured at the center of the biscuit, of 115° F. at 15 minutes, and had a light golden brown color on the surface.

Following baking, each of the biscuit formulations was observed for texture, appearance, and flavor. Each of the formulations exhibited acceptable texture, appearance, and flavor, with the fast baking formulations being slightly darker.

Example 2

The High and Control dough formulations from Example 1 were produced and allowed to proof at about 70° F. temperature. The dough density was measured over the course of the proofing. FIG. 1 shows the dough densities of the High and Control dough formulations over time. At 10 to 15 minutes, when biscuits would have been formed and frozen for the High formulation, the High formulation had a density of about 1.040 g/cm$^3$ to 1.050 g/cm$^3$, while the Control formulation had a density of about 1.100 g/cm$^3$.

Example 3

Figure 2:
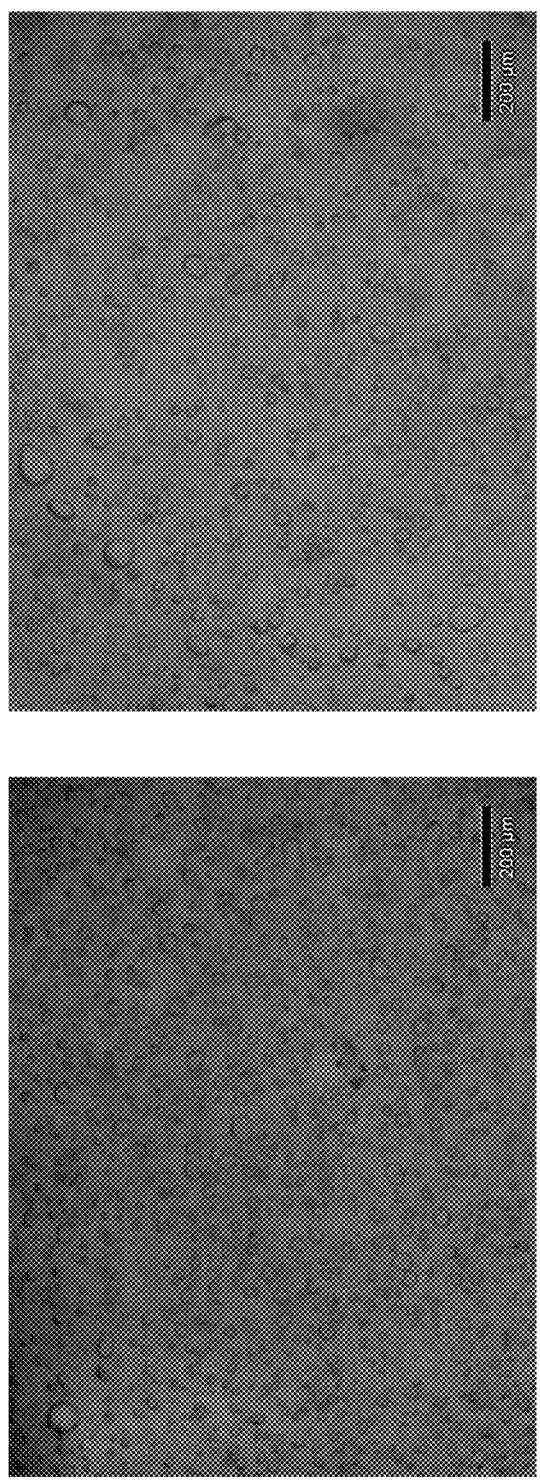
FIG. 2 shows photomicrographs of a frozen product having a reduced bake time according to an embodiment provided herein and a traditional frozen biscuit dough without a reduced bake time.

The High and Control dough formulations produced, proofed, and formed according to Example 1. The structure of the dough was observed prior to baking using light microscopy and the structure and appearance of the biscuit was observed during baking by regular photography. Briefly, each dough was sampled from frozen as soon as slightly softened. The samples were placed one a well slide and depressed to 180 μm thick with even force, and a cover slip was placed on the top. The samples were visualized using an Olympus AX 70 microscope with transmitted light and a 10× objective, and imaged using an Olympus DP 70 digital camera. FIG. 2 shows that the High formula had an overall higher average total void area in a large number of relatively evenly distributed voids, while in comparison, the Control formula exhibited a lower average total void area in voids that were distributed less evenly throughout the dough.

Figure 3:
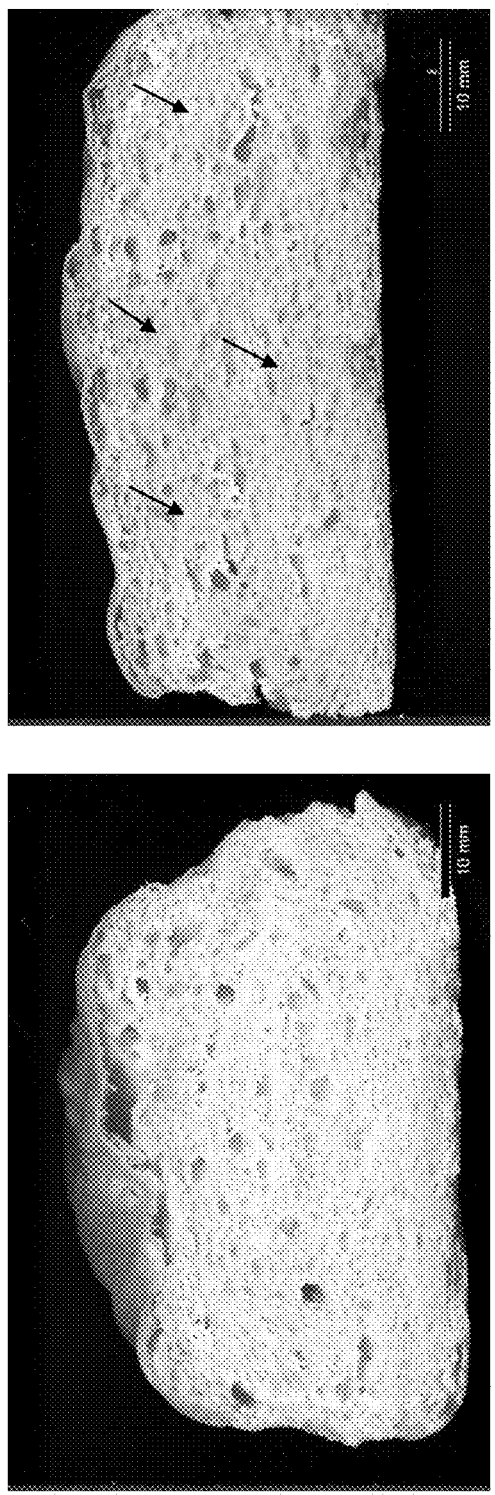
FIG. 3 shows photographs of a frozen product having a reduced bake time according to an embodiment provided herein and a traditional frozen biscuit dough without a reduced bake time after baking at 360° F. for 15 minutes.

FIG. 3 shows that, at 15 minutes in a 360° convection oven, the High formulation biscuit exhibited signs of being fully cooked, including a dry appearance in the center. At 15 minutes, the surface of the High formula biscuit is a brown color. In comparison, FIG. 3 shows that, at 15 minutes in a 360° F. convection oven, the Control formula biscuit, though brown on the outside, has a moist, doughy appearing center (arrows showing areas of uncooked dough).

Example 4

The High and Control dough formulations were produced, proofed, and formed under production plant conditions. Briefly, ingredients were mixed in a mixer for 5-10 minutes to produce 1750 lb. batches of each dough. The doughs were transferred into a hopper and transferred to a conveyor sheeting line. Each dough was conveyed through a three-roll extruder and a series of dough reduction units to form a sheet with an average thickness of about 20 mm, followed by cutting into oval biscuit shapes of 69 mm wide×75 mm long, and about 80 grams apiece (+/−3 g). The formed dough was then conveyed into a blast freezer. Density measurements were taken at 5 points: 1) immediately following mixing (mixer), 2) immediately following transfer to the hopper (hopper), 3) the end of each batch prior to extrusion in the first roller (end hopper), 4) immediately following cutting (mid line), and 5) immediately prior to entering the freezer (end line). Average densities at each point are shown in FIG. 5.

Figure 5:
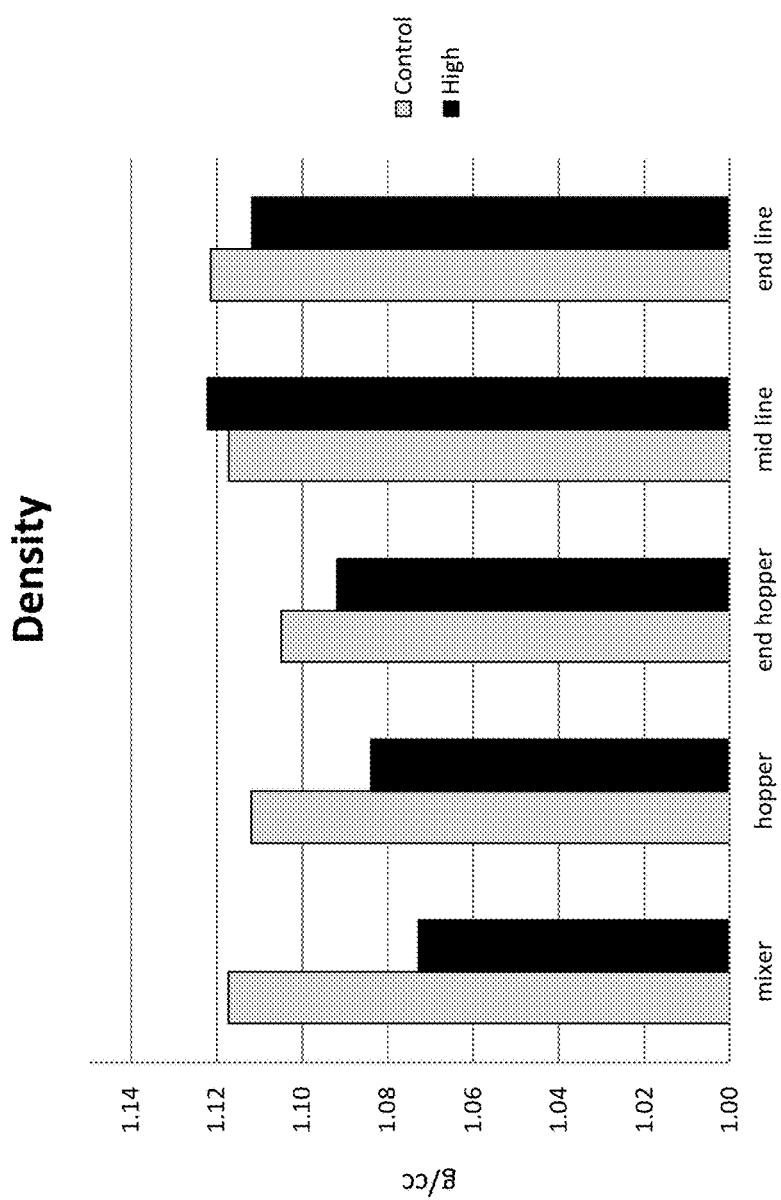
FIG. 5 is a graph of density during processing of a dough for a frozen product having a reduced bake time made according to an embodiment provided herein as compared to a dough for a traditional frozen biscuit dough without a reduced bake time.

As can be seen in FIG. 5, the High formulation reached a density of about 1.072 g/cc immediately following mixing, and increased in density as it was transferred to the conveyor and was formed along the line. In contrast, the Control formulation had a density of about 1.117 immediately following mixing and continued to proof slightly following transfer to the conveyor, but the density after forming was similar to the High formulation.

While the density profiles of both formulations were similar due to the sheeting process (fixed size and weight), light microscopy of frozen biscuit dough made from each of the High and Control formulations showed that the High formulation had a larger average number of individual voids, a higher average total void area, and voids that are generally more evenly distributed throughout the dough. The samples were prepared and imaged as described in Example 3. The images were then processed using Image-Pro® Plus v. 6.0 (MediaCybernetics®, Rockville, Md., USA). Briefly, the images were calibrated with a micron bar and individual void walls were thresholded. The area of maximum diameter was calculated from detected pixels of the thresholded void walls for each individual void. FIG. 3 shows an example of a photomicrograph showing void spaces in black. Void number and total void space area from 6 samples of frozen biscuit dough from each of the High and Control formulations were quantified. Results of the quantification are shown in Table 2.

TABLE 2

|  | Control | High |
|---|---|---|
| Minimum individual void area ($\mu m^2$) | 13.1 | 5.2 |
| Maximum individual void area ($\mu m^2$) | 2765 | 7347 |
| Average individual void area ($\mu m^2$) | 217 | 428 |
| Total number of voids observed | 344 | 524 |
| Total void space area ($\mu m^2$) | 74703 | 224106 |
| Total viewed area ($\mu m^2$) | 999720 | 999720 |
| Average % cross sectional area that is void space | 7.5 | 22.4 |
| Average void diameter ($\mu m$) | 15.0 | 19.6 |

The invention claimed is:

1. A method for making a frozen product, comprising:
   a. combining at least a grain flour, water, a fat, and a leavening system including monocalcium phosphate and a leavening alkali to form a dough;
   b. proofing the dough to form a leavened dough having a density of from 1.000 g/cm$^3$ to 1.080 g/cm$^3$;
   c. forming the leavened dough into a desired shape to make a formed dough; and
   d. freezing the formed dough to produce a frozen product having a density of from about 1.065 to about 1.155 g/cm$^3$ and an average cross sectional area that comprises 12% to 35% void area.

2. The method of claim 1, wherein the freezing step is performed about 5 minutes to about 15 minutes following the combining step.

3. The method of claim 1, wherein at least a portion of the proofing step is performed during at least a portion of the combining step and/or at least a portion of the forming step.

4. The method of claim 1, wherein the forming step comprises sheeting and cutting the leavened dough into a biscuit shape.

5. The method claim 1, wherein the sheeting includes adding reworked dough to the leavened dough.

6. The method of claim 1, wherein the dough has a pH of from about 6.6 to 7.2.

7. The method of claim 1, wherein the dough further comprises a cultured dairy component.

8. The method of claim 1, wherein the leavening system further includes sodium aluminum phosphate and/or sodium acid pyrophosphate.

9. The method of claim 6, wherein the dough has a pH of from 6.8 to 7.1.

10. The method of claim 9, wherein the dough has a pH of from 6.9 to 7.0.

11. The method of claim 1, wherein the water constitutes 25%-40% of the dough.

12. The method of claim 11, wherein the water constitutes 28%-38% of the dough.

13. The method of claim 11, wherein the fat constitutes 10%-15% of the dough.

14. A method for making a frozen product, comprising:
   a. combining at least a grain flour, water, a fat, and a chemical leavening system to form a dough;
   b. proofing the dough to form a leavened dough having a density of from 1.000 g/cm$^3$ to 1.080 g/cm$^3$;
   c. forming the leavened dough into a desired shape to make a formed dough; and
   d. freezing the formed dough to produce a frozen product having an average cross sectional area that comprises 12% to 35% void area with the density of from 1.000 g/cm$^3$ to 1.080 g/cm$^3$.

15. The method of claim 14, wherein the chemical leavening system includes monocalcium phosphate and a leavening alkali.

16. The method of claim 14, wherein all of the combining, proofing, forming and freezing steps are performed in less than 30 minutes total.

17. The method of claim 14, wherein the dough rises to the density at a temperature of 55° F. to 75° F. within about 5 minutes to 15 minutes following combining the grain flour, the water, the fat and the chemical leavening system.

18. The method of claim 14, wherein the frozen product has a shelf life of at least 3 months when stored at 0° F. or less.

19. The method of claim 14, wherein the frozen product can be baked from frozen, without prior thawing, in from 20% to 50% less time than a traditional, corresponding frozen product.

20. A method for making a frozen biscuit product with an average void area per cross sectional area to reduce baking time without prior thawing, comprising:
   e. combining at least a grain flour, water, a fat, and a chemical leavening system to form a dough;
   f. proofing the dough to form a leavened dough having a density of from 1.000 g/cm$^3$ to 1.080 g/cm$^3$;
   g. forming the leavened dough into a desired shape to make a formed dough; and
   h. freezing the formed dough to produce a frozen product having an average cross sectional area that comprises 12% to 35% void area with the density of from 1.000 g/cm³ to 1.080 g/cm³, wherein the frozen biscuit product can be baked from frozen, without prior thawing, in less time than a traditional frozen biscuit dough.

21. The method of claim 1, wherein the formed dough is a formed biscuit dough having a temperature of less than about 10° F.

* * * * *